United States Patent
Wu et al.

(10) Patent No.: US 8,155,774 B2
(45) Date of Patent: Apr. 10, 2012

(54) 3D OBJECT FABRICATION METHODS AND SYSTEMS

(75) Inventors: Jeng-Feng Wu, Chiayi County (TW); Chia-Chen Chen, Hsinchu (TW); Hsien-Chang Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 188 days.

(21) Appl. No.: 11/982,857

(22) Filed: Nov. 5, 2007

(65) Prior Publication Data

US 2009/0012640 A1 Jan. 8, 2009

(30) Foreign Application Priority Data

Jul. 4, 2007 (TW) ................... 96124277 A

(51) Int. Cl.
*G06F 19/00* (2006.01)
(52) U.S. Cl. ........... 700/119; 700/98; 264/308; 433/213
(58) Field of Classification Search ............ 700/98, 700/118, 119; 235/462.42, 462.43, 454; 433/213; 264/308
See application file for complete search history.

(56) References Cited

U.S. PATENT DOCUMENTS

| 4,575,330 A | 3/1986 | Hull |
| 5,596,504 A | 1/1997 | Tata et al. |
| 6,021,358 A | 2/2000 | Sachs |
| 6,480,299 B1* | 11/2002 | Drakopoulos et al. ......... 358/1.9 |
| 2008/0192074 A1* | 8/2008 | Dubois et al. ............. 347/5 |

OTHER PUBLICATIONS

Taiwan Patent Office, Office Action, Patent Application Serial No. 096124277, Mar. 18, 2011.
Mon-U Huang, "Model Support Algorithm in Rapid Prototyping," Masters Thesis, Jun. 2005, Taiwan.

* cited by examiner

*Primary Examiner* — Albert Decady
*Assistant Examiner* — Douglas Lee

(57) ABSTRACT

A 3D object fabrication method implemented in a fabrication system includes the following steps. A digital object model is retrieved. Sections of the digital object model are respectively printed on plural pieces of plane material. The pieces of plane material are combined to form a physical 3D object of the digital object model.

15 Claims, 10 Drawing Sheets

3D OBJECT FABRICATION METHODS AND SYSTEMS

BACKGROUND OF THE INVENTION

1. Field of the Invention

The invention relates to computer techniques, and more particularly to a method for memory access.

2. Description of the Related Art

Conventionally, constructing a physical sample using a 3D object model is implemented using computerized numerical control (CNC) processing, which generates processing paths using computer programs and transmits the processing paths to a cutting machine for physical shape processing. The method and system consumes time and manpower. Recently, a rapid prototyping for laser formation of images directly calculates tangent plane data of a model and performs rapid 3D shaping using laser formation of images, which is relatively faster and more convenient than conventional methods and systems. The rapid prototyping for laser formation of images, however, has high costs and applicable material is restricted and cannot generate a full-color 3D physical object for a digital model.

Conventionally, 3D formation of images comprises laser rapid prototyping, 3D printing, and laser dust sinter and so on. With respect to restrictions of the described methods for formation material and technologies, however, only a physical model with monochrome or combinations of few colors can be created. Further, with respect to transforming 2D sections to 3D sections, only geometric graph data is output. However, related rapid prototyping methods have been disclosed.

U.S. Pat. No. 4,575,330 discloses "Apparatus for production of three-dimensional objects by stereo-lithography", printing 3D model using fluid material. Solidification time for the fluid material affects precision of a printed 3D stereo model and a full-color model cannot be printed.

U.S. Pat. No. 5,596,504 discloses "Apparatus and method for layered modeling of intended objects represented in STL format and adaptive", in which the shape of a created 3D object is restricted to the color of input materials.

U.S. Pat. No. 6,021,358 discloses "Three dimensional model and mold making method using thick-slice subtractive fabrication", in which print precision cannot be adjusted.

BRIEF SUMMARY OF THE INVENTION

The invention provides 3D object fabrication methods. An exemplary embodiment of a 3D object fabrication method comprises retrieving a digital object model, generating a plurality of sections of the digital object model on a plurality of planes perpendicular to a vector, outputting the sections to plural pieces of plane material, and combining the pieces of plane material to form a physical 3D object of the digital object model.

Another embodiment of a 3D object fabrication method comprises retrieving a digital object model, respectively printing sections of the digital object model on plural pieces of plane material, and combining the pieces of plane material to form a physical 3D object of the digital object model.

The invention provides 3D object fabrication systems. An exemplary embodiment of a 3D object fabrication system comprises a computer device and an output device.

The computer device retrieves a digital object model and generates a plurality of sections of the digital object model on a plurality of planes perpendicular to a vector. The output device outputs the sections to plural pieces of plane material and combines the pieces of plane material to form a physical 3D object of the digital object model.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
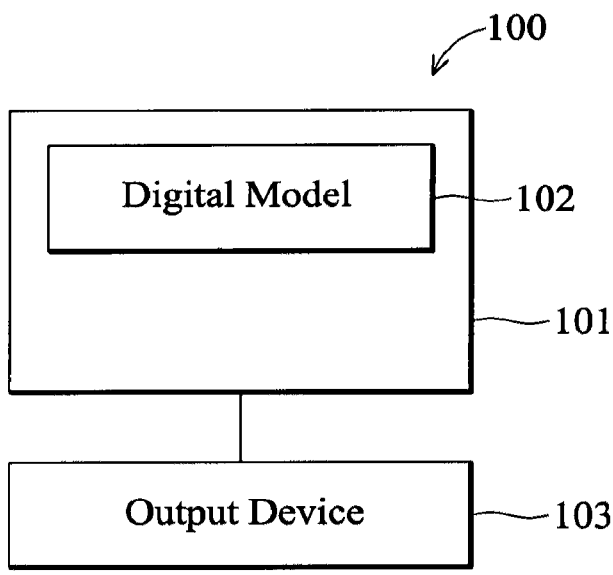
FIG. 1 is a schematic view of an embodiment of a 3D object fabrication system according to the invention.

Several exemplary embodiments of the invention are described with reference to FIGS. 1 through 13, which generally relate to 3D object fabrication. It is to be understood that the following disclosure provides various different embodiments as examples for implementing different features of the invention. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a 3D object fabrication method and system.

FIG. 1 is a schematic view of an embodiment of a 3D object fabrication system 100 according to the invention. The 3D object fabrication system 100 comprises a computer device 101, a digital model 102, and an output 103. The computer device 101 may be a desktop, a notebook, a tablet personal computer, a personal digital assistant (PDA), or other information processing device.

The digital model 102 is a 3D model represented by digital data, composed of meshes. The 3D model represented by a digital model can simulate various shapes, articles, or scenes. The digital model 102 can be input from an external device to the computer device 101, retrieved from a storage device of the computer device 101, or generated by the computer device 101.

The output device 103 outputs sections (or cross-sections) of the digital model 102. The output device 103 comprises a print device or a segment device. The print device may be a printer, printing sections of the digital model 102 on plane material like films or papers. The segment device segments plan material like films or papers according to the sections of the digital model 102. Plural pieces of plane material output from the output device 103 are combined to form a physical 3D object of the digital model 102. An example for the plane material representing a transparent film is illustrated in the following, which is not to be limitative.

The 3D object fabrication system 100 performs a 3D object fabrication method. With respect to a digitalized 3D model, 2D color sections for segmenting the 3D model are generated according to a designated direction, a desired width for the sections is adjusted in accordance with thickness of the film, desired marks for positioning is automatically generated for each section, and a series of 2D images for printing are output.

A detailed 3D object fabrication method is described.

Figure 2:
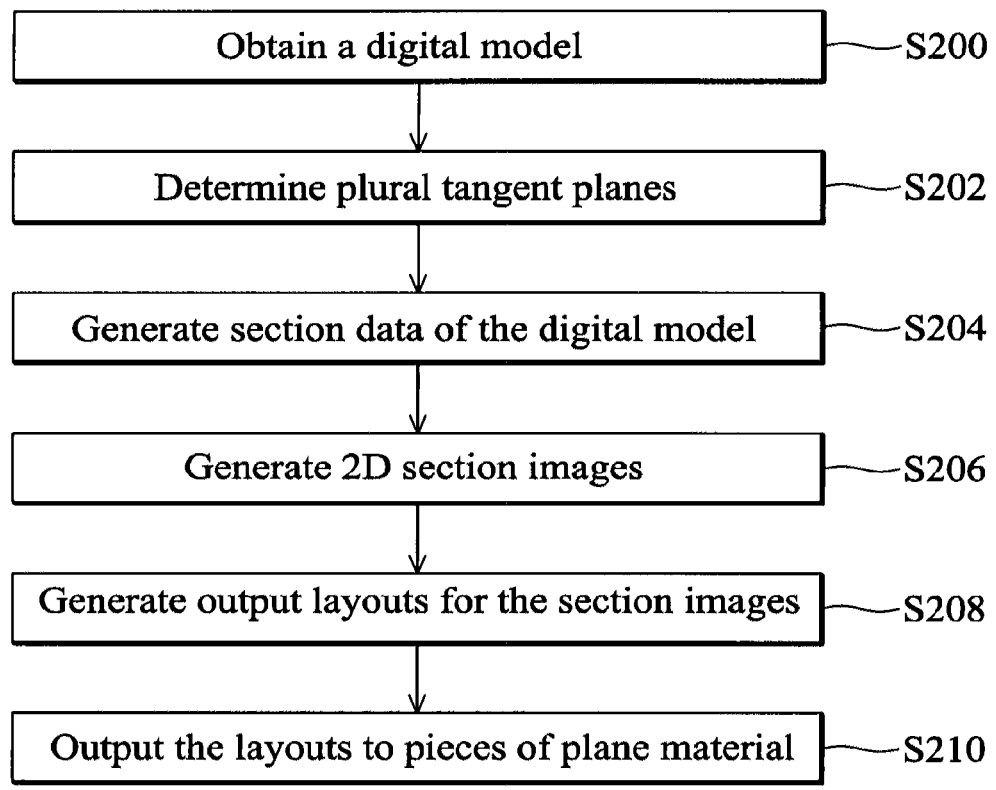
FIG. 2 is a flowchart of an embodiment of a 3D object fabrication method according to the invention.

FIG. 2 is a flowchart of an embodiment of a 3D object fabrication method according to the invention.

Figure 3:
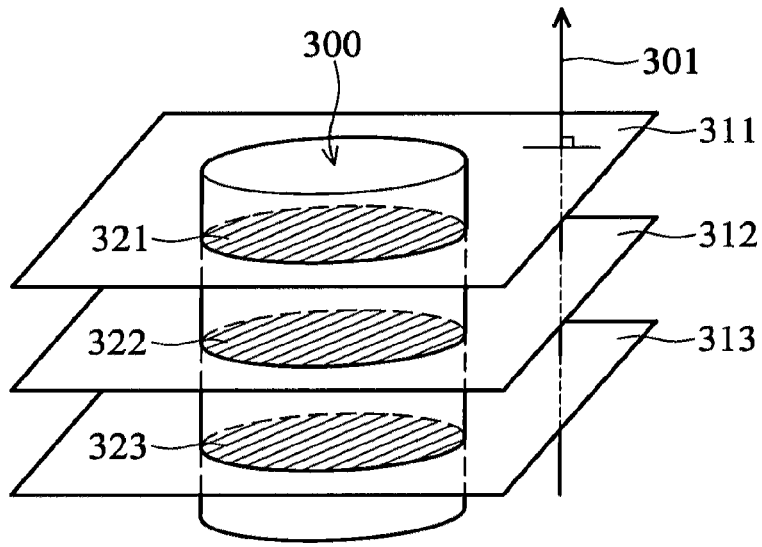
FIG. 3 is a schematic view of an embodiment of a digital model and tangent planes according to the invention.

The 3D model 102 with a color pattern map is loaded in the computer device 101. Referring to FIG. 2, the computer device 101 obtains the digital model 102 (step S200) and calculates all the plural planes (or called tangent planes) for determining the sections of the digital model 102 (step S202). The plural planes are perpendicular to a vector, a normal vector of the planes. FIG. 3 is a schematic view of an embodiment of the digital model 102 and tangent planes of the invention. Planes 311, 312, and 313 are perpendicular to a vector 301. Sections for a digital model 300 intersecting with the planes 311, 312, and 313 comprise sections 321, 322, and 323. The number of the tangent planes and distances between the tangent planes can be adjusted.

The computer device 101 performs calculations to generate sections where the digital model 102 intersects the planes (step S204), which are composed of intersecting points between the digital model and the planes. The sections comprise coordinates and color information of the intersecting points. The computer device 101 calculates point data (coordinates, for example) and color information to obtain intersecting points between the tangent planes and the digital model 102.

The computer device 101 generates all sections, 2D section images, for the digital model 102 (step S206). The computer device 101 records 2D information and color information of the tangent planes generated by the tangent planes intersecting the digital model 102, for loading in a layout picture of an output image later.

The computer device 101 generates plural layouts for outputting the section images (step S208), in which each layout comprises a section image and a positioning mark. The computer device 101 transmits the layouts to the output device 103 and the output device 103 outputs the layouts to the pieces of plane material (step S210).

The output device 103 comprises, for example, a printing device, such as a laser printer, an inkjet printer, or other type printers. The printing device respectively prints the sections on transparent films or pieces of plane material, such as papers. If the sections are respectively printed on the transparent films, cutting for the films to be superposed is not required to represent a 3D object. If the sections are respectively printed on opaque pieces of plane material, the pieces of plane material should be cut along outline lines of each section after or before the pieces of plane material are superposed. The output device 103 can also comprises a device for implementing the cutting process.

The pieces of plane material output by the output device 103 are superposed according to the positioning marks. The 3D object fabrication system 100 may comprise a device for combining the pieces of plane material to construct the physical 3D object for the digital model 102.

Figure 4:
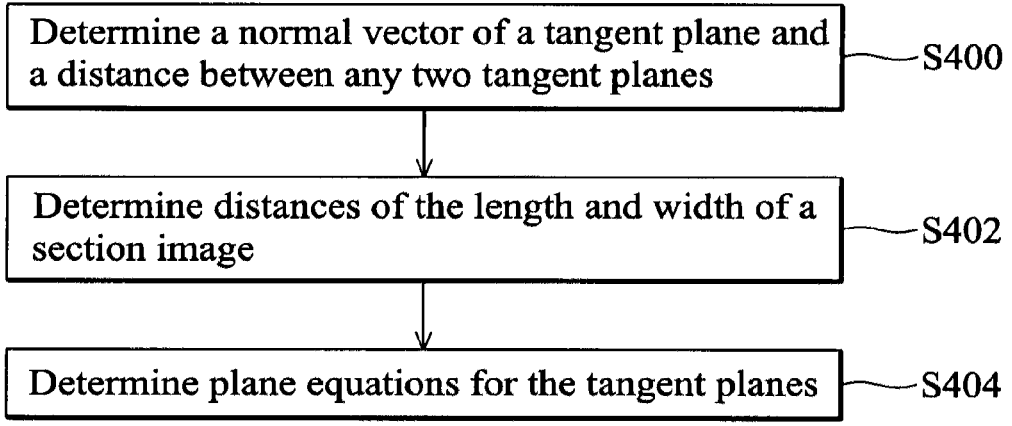
FIG. 4 is a flowchart of an embodiment of a method for determining tangent planes according to the inventions.

FIG. 4 is a flowchart of an embodiment of a method for determining tangent planes according to the invention, detailing the step S202.

The 3D model with a color pattern map is loaded and all tangent planes thereof are determined. The computer device 101 determines a normal vector (vector 301, for example) of a tangent plane and a distance between any two tangent planes (step S400), such as the distance between the planes 311 and 312. The computer device 101 calculates a range on a tangent plane on which all 3D point data are to be projected to determine storing distances of the length and width of a section image (step S402).

The normal vector of the tangent plane is determined according to an observed object. The computer device 101 provides a user interface to set the normal vector. The distance of the tangent plane is determined based on the thickness of the transparent film, such that the size of a superposed object may only be equal to that of the physical object. The computer device 101 may provide a user interface to set the distance apart from the tangent plane. The 3D object fabrication system 100 may comprise a sensor for automatically detecting the thickness of the transparent film and thus automatically determine and set an appropriate distance (the distance equal to the thickness of the film, for example) apart from the tangent plane.

The computer device 101 determines plane equations for the tangent planes (step S404). A plane acts as a reference plane. The computer device 101 determines a range for all the tangent planes intersecting the 3D model according to distances from the 3D point data to the plane and calculates the number of planes for the tangent planes intersecting the 3D model and respective plane equations within the range according to the distances apart from the tangent planes and normal vectors of the tangent planes. 2D data points and color information of the 3D model projected on the tangent planes can be calculated using the tangent plane equations, implemented and described in FIG. 5.

Figure 5:
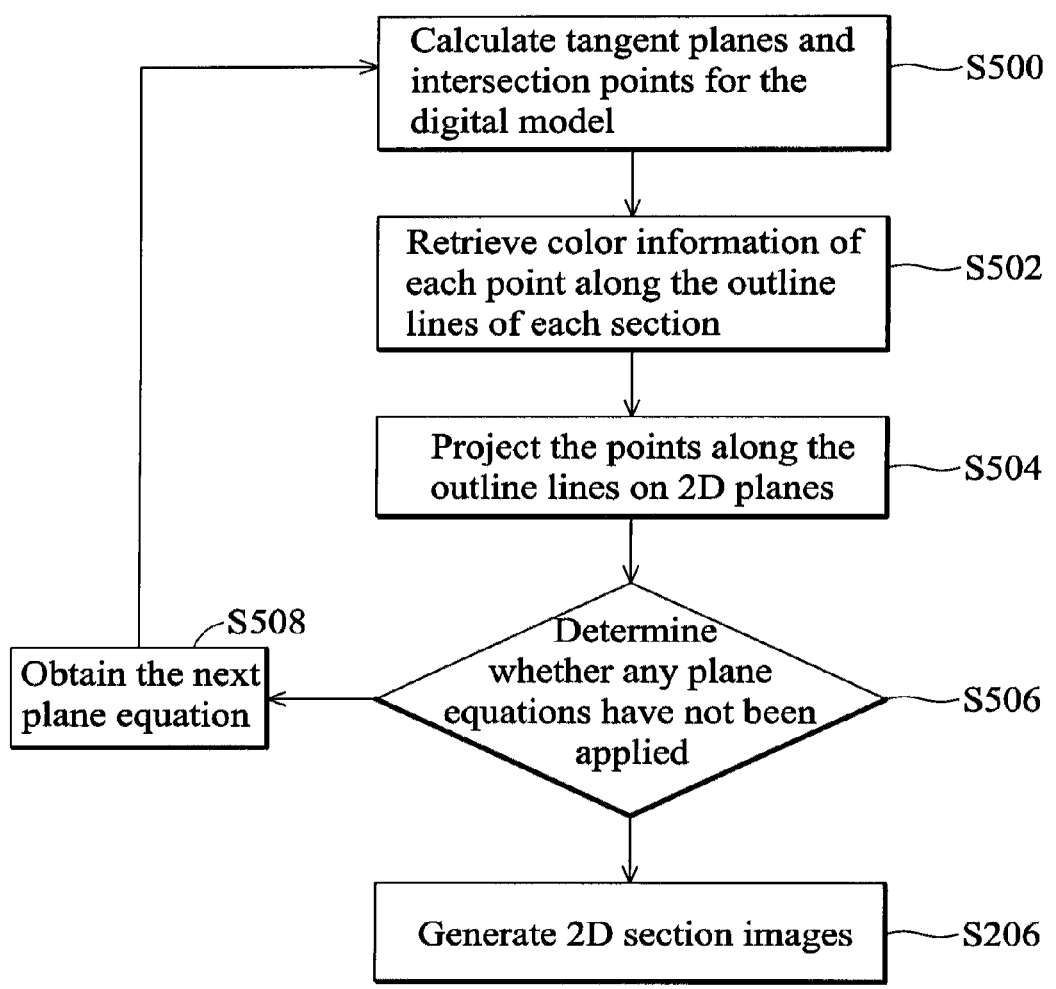
FIG. 5 is a flowchart of an embodiment of a method for generating section data according to the invention.

FIG. 5 is a flowchart of an embodiment of a method for generating section data according to the invention, detailing the step S404.

The computer device 101 calculates tangent planes and intersection points for the digital model 102 using a plane equation (step S500). The computer device 101 may further calculate 3D point information along complete outline lines of each section based on the intersecting points using interpolation.

The computer device 101 retrieves color information of each point along the outline lines of each section from the 3D model (step S502) and projects the points along the outline lines on 2D planes (step S504), for example, projected on each tangent plane or the layouts.

During the projection process, a point data is projected on the 2D plane and 3D coordinates thereof are transformed to 2D coordinates on the 2D plane. Referring to FIG. 3, for example, the points along the outline line the section 321 are projected on the tangent plane 311 to retrieve 2D coordinates of each point on the tangent plane 311. Similarly, in step S504, the points along the outline lines of the sections 322 and 323 are projected on the tangent plane 312 and 313.

When the points along the outline lines are projected on the 2D planes to generate 2D point data, original color information can be continuously used. When a first point (the point data 801 shown in FIG. 8, for example) on a section of the 3D model, for example, is projected on a 2D plane to become a second point (the point data 802 shown in FIG. 8 or the point data 803 shown in FIG. 11, for example), the computer device 101 determines a color of the second point (a color of the point data 802 shown in FIG. 8 or a color of the point data 803 shown in FIG. 11, for example) according to a color of the first point (a color of the point data 801 shown in FIG. 8, for example). The sections are respectively printed on the pieces of plane material with color pigments. The computer device 101 prints a color (a color of the point data 804 shown in FIG. 12, for example) for the color pigment of the second point data on a piece of plane material according to the color of the second point data on the section.

The computer device 101 determines whether any plane equations have not been applied (step S506), and, if not, performs step S206, and, if so, obtains the next plane equation (step S508) to repeat the described steps until all the plane equations have been applied.

Additionally, sections for the planes and the 3D object may be used to generate more than 2 outline curves. Thus, when intersection points are calculated, point data belonging to the same curve should be recorded. Arrays, for example, can be used to record point data along the same outline line. When 2D data points and color information are retrieved, section images for the digital model 102 cab be generated, described in FIG. 6.

Figure 6:
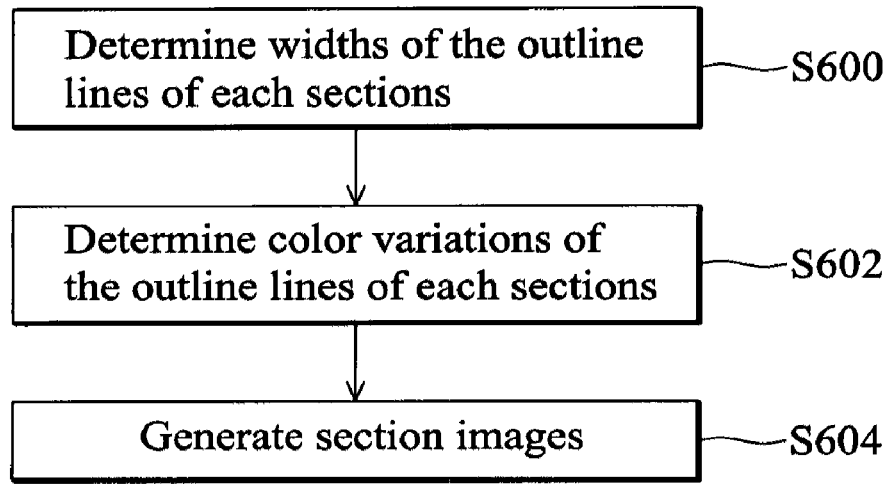
FIG. 6 is a flowchart of an embodiment of a method for generating section images according to the invention.

FIG. 6 is a flowchart of an embodiment of a method for generating section images according to the invention, detailing the step S206.

The computer device determines widths (step S600) and color variations (step S602) of the outline lines of each sections. The width of each section is determined according to a distance between two tangent planes. When the distance between the tangent planes is longer, the gap difference between the outline lines is bigger, such that it seems a gap outline line resides between superposed outline lines. Thus, a wider painting brush drawing logic is required when the distance between two tangent planes is longer while a narrower painting brush drawing logic is required when the distance between two tangent planes is shorter. If the painting brush is too wide to overlap the outline lines while superposed, the color of a section may be different from that of a physical object.

The computer device 101 may determine colors of each point between two neighboring pieces of 2D point data according to the two pieces of 2D point data using interpolation and color gradient.

The computer device generates section images according to setting such as the widths and color variations (step S604). The computer device 101, for example, connects all points belonging to the same outline line to become a line segment kept in a file, forming a section image comprising the width.

To save system resources and space, multiple section images can be simultaneously loaded in a layout for typesetting and marking.

Figure 7:
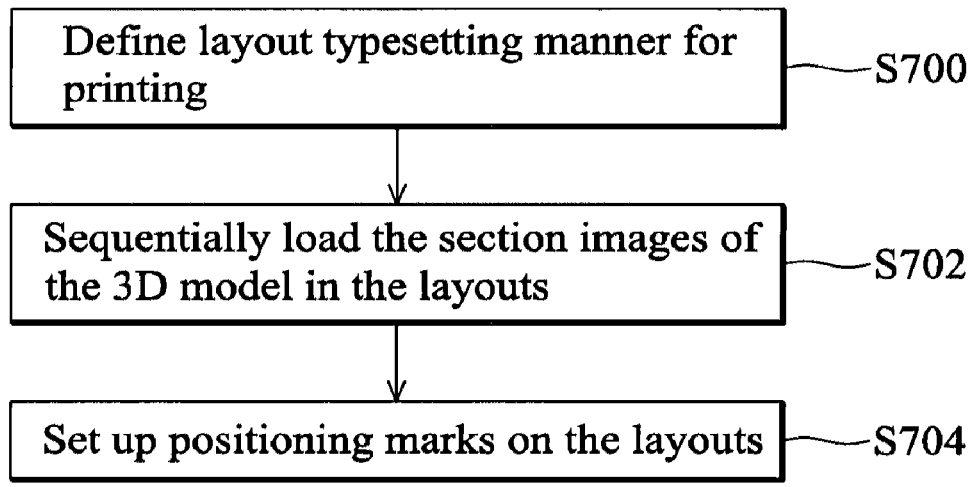
FIG. 7 is a flowchart of an embodiment of a method for generating layouts for outputting according to the invention.

FIG. 7 is a flowchart of an embodiment of a method for generating layouts for outputting according to the invention, detailing the step S208.

Figure 8:
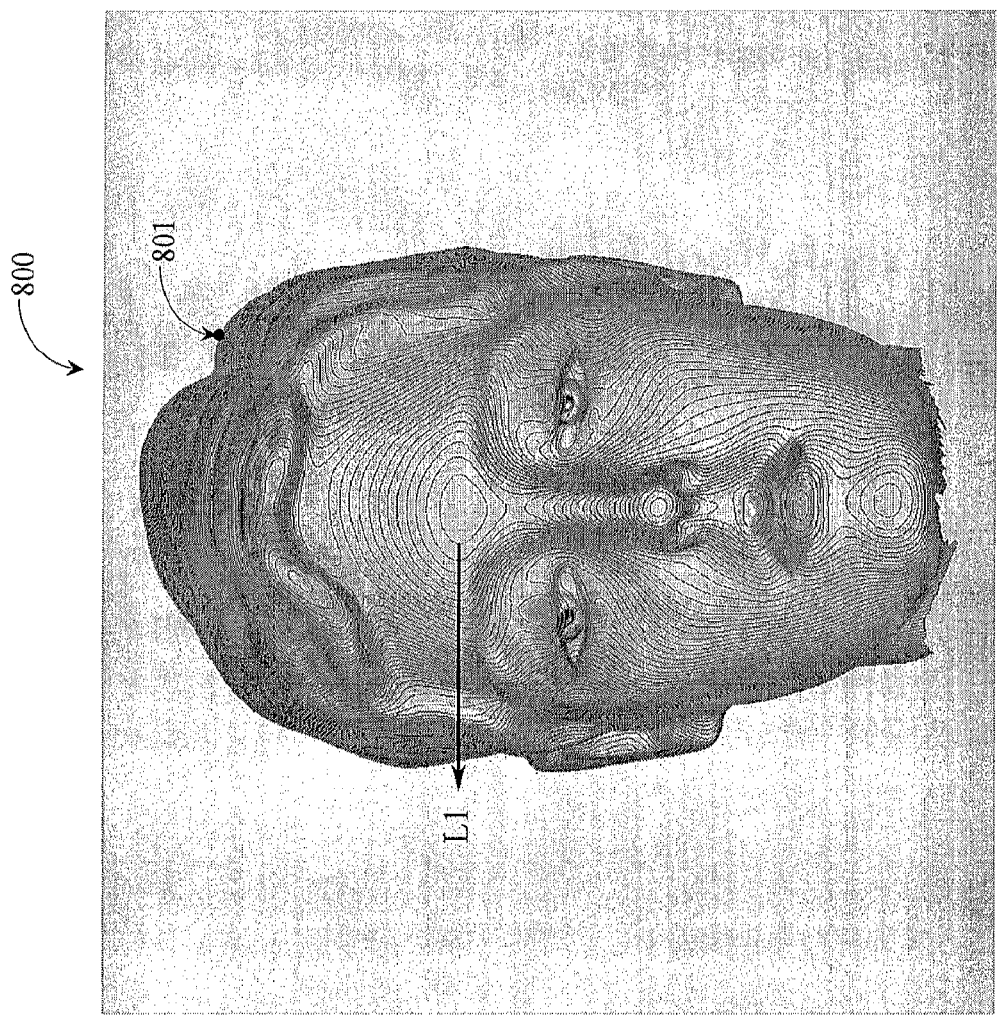
FIG. 8 is a front view of a digital 3D stereo model.
Figure 9:
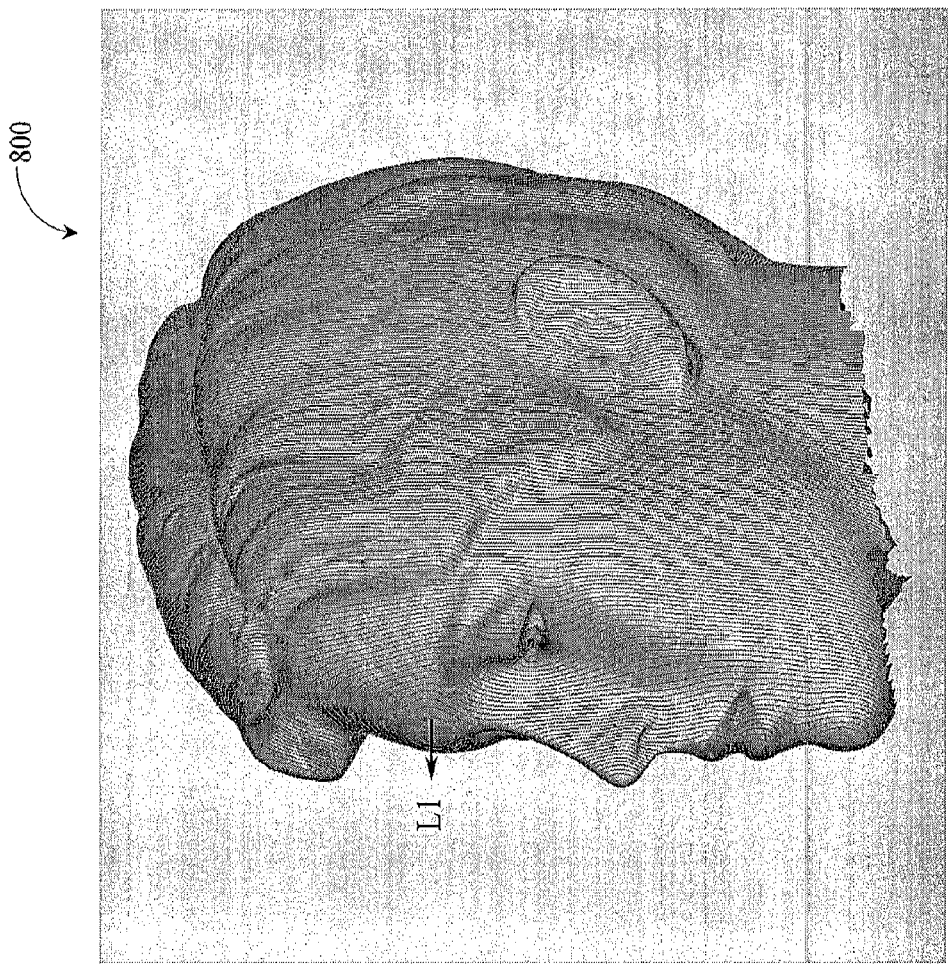
FIG. 9 is a side view of the digital 3D stereo model.
Figure 10:
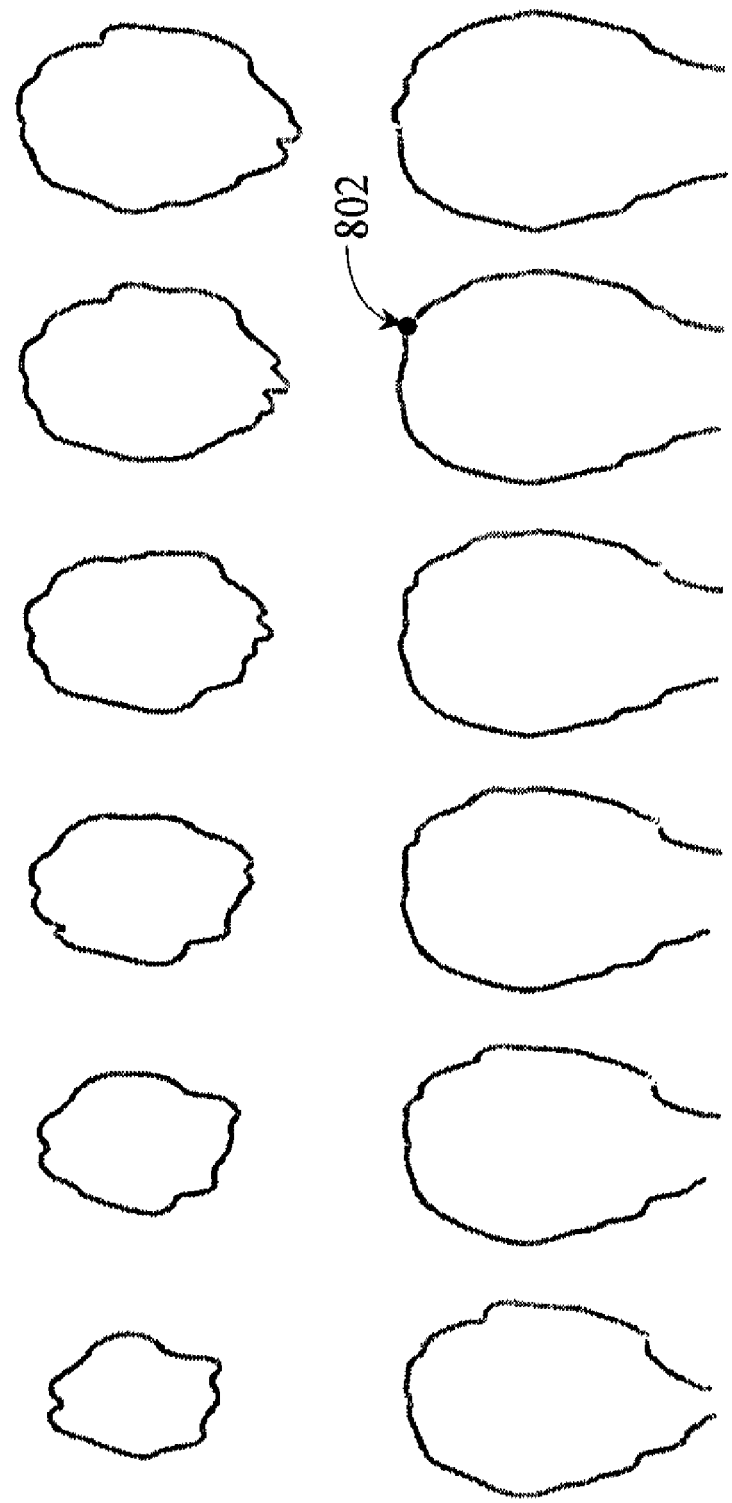
FIG. 10 is a schematic view of section images of the digital 3D stereo model.

The computer device 101 defines layout typesetting manners for printing (step S700), comprising a size of the layout, a frame, and marking orders of each layout, such that the superposing for outputs (transparent films, for example) of each layout will not be disordered. FIG. 8 is a front view of a digital 3D stereo model. FIG. 9 is a side view of the digital 3D stereo model. Line segments on the surface of the model 800 represent outline lines (the outline line L1, for example) formed by intersecting tangent planes. FIG. 10 is a schematic view of section images formed by projecting section data (comprising 2D data and color information) generated by each tangent plane intersecting the 3D model on the tangent planes.

The computer device 101 sequentially loads the section images of the 3D model in the layouts (step S702) and sets up positioning marks on the layouts (step S704). Setting up the positioning marks is capable of conveniently cutting the transparent films according to positioning points and sequentially superposing the cut films to generate a 3D physical object.

Figure 11:
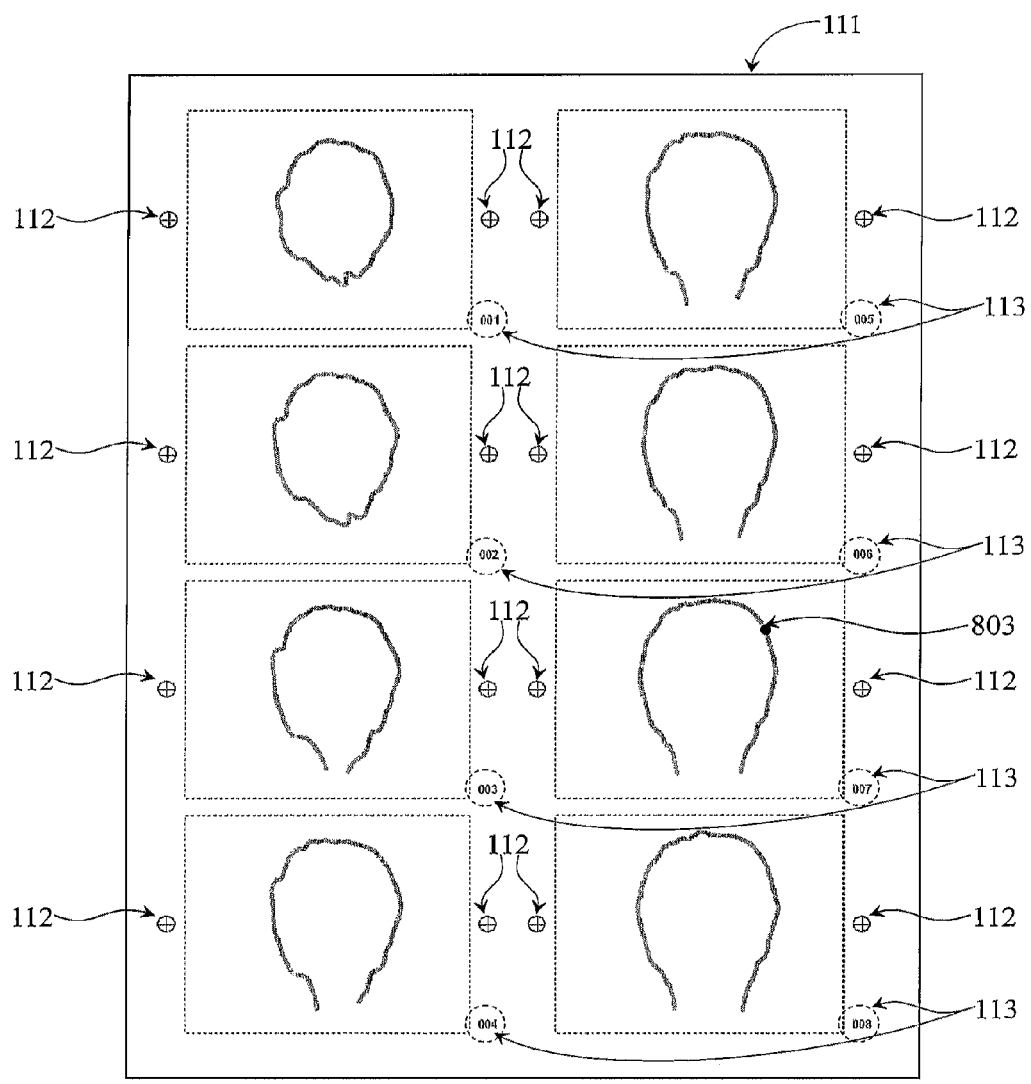
FIG. 11 is an example of typesetting layouts.
Figure 12:
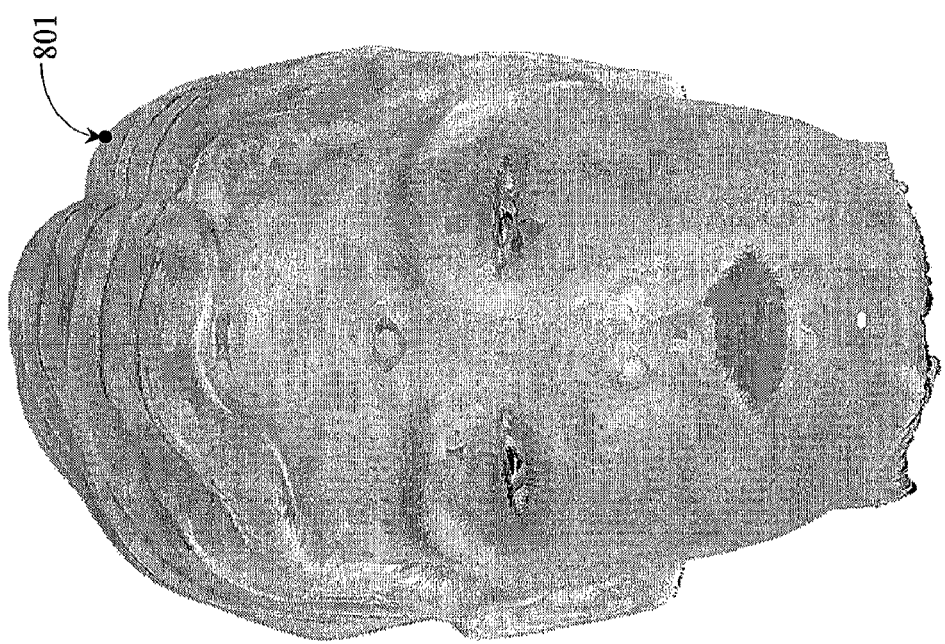
FIG. 12 is a schematic view of a simulation result for stack cutting the section images.

FIG. 11 is an example of typesetting layouts, printing the layout 11 by typesetting and marking the orders of the sections and the cut positioning marks. Portions of sections shown in FIG. 10 have been loaded in the layout 111, in which the positioning mark 112 and the section order number 113 are provided. FIG. 12 is a schematic view of a simulation result for stack cutting the section images.

Figure 13:
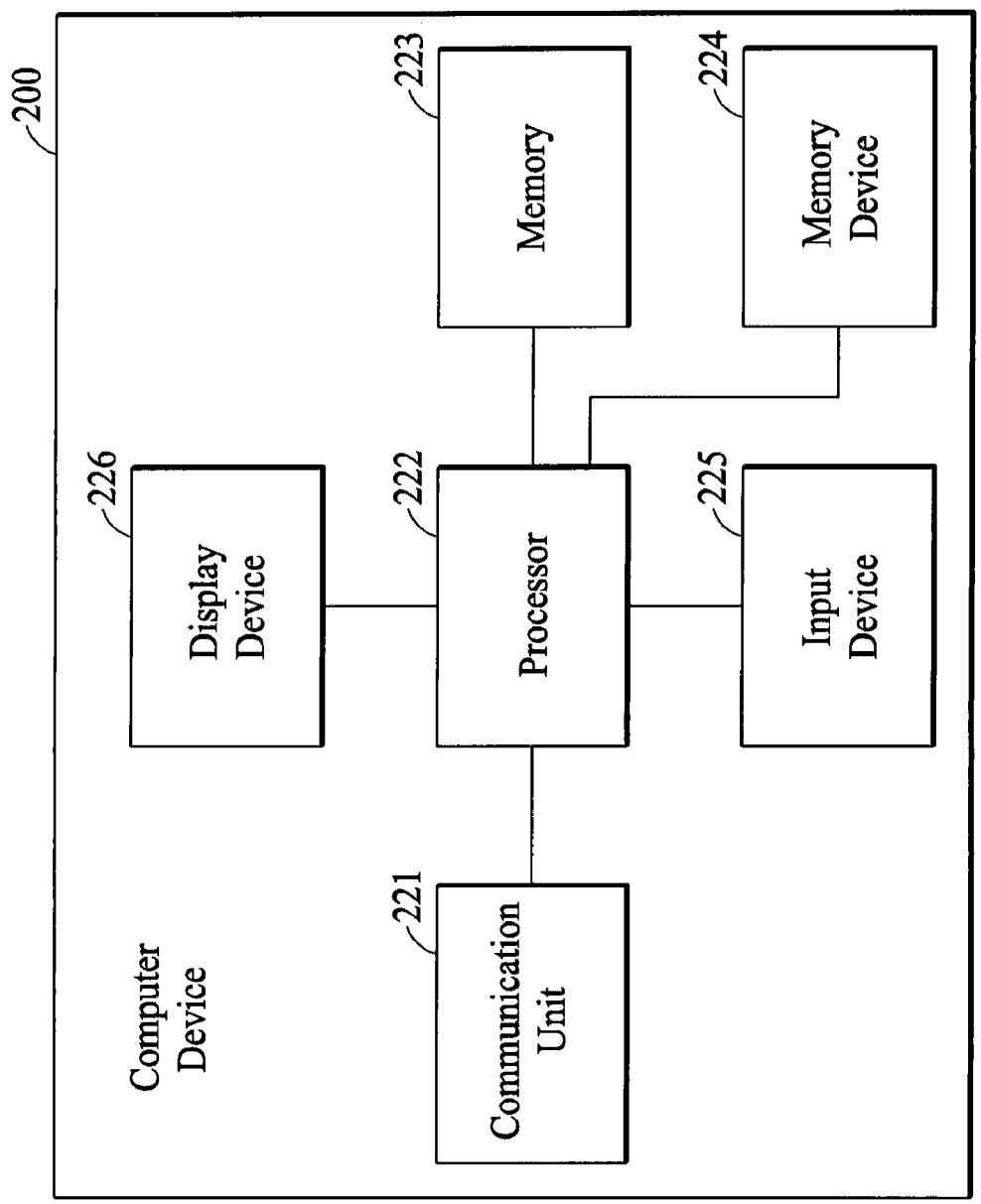
FIG. 13 is a schematic view of an embodiment of a computer device according to the invention.

The 3D object fabrication system 100 can be composed of computer programs or circuits. The computer program can be stored in a computer-readable storage medium. When the computer program is loaded in a computer device, the computer device performs steps thereof. FIG. 13 is a schematic view of an embodiment of a computer device according to the invention.

The computer device 200 comprises a communication unit 221, a processor 222, a memory 223, a memory device 224, an input device 225, and a display device 226.

The communication unit 221 connects networks or various transmission lines for control transmitting and receiving of information. The processor 222 processes data based on predefined programs, for example, the programs stored in the memory 223, the memory device 224, or a remote host. The memory 223 acts a memory region for operations of the processor 222. The memory device 224 stores programs, such as program modules in the 3D object fabrication system 100. The memory device 224 can be a floppy disc, a CD-ROM drive, a hard disc, or an external storage device.

The 3D Object fabrication method and system directly prints the sections of the 3D model on the transparent films and sequentially superposes the printed color films to form a full-color 3D physical object. When an accurate 3D physical object is generated, accurate section shapes and colors are first generated, and compensations for superposition positioning and color printing are also required.

The imaging quality for a 3D physical object superposed by transparent films is determined by films, printing images, and positioning. Printed 2D section images must be calculated using the original digital full-color model. The thickness of a film may affect the result of superposition imaging. Thus, the outline line widths printed for each section must be adjusted. Simultaneously, positioning marks must be generated to enable accurate section superposition, such that section bonding for a 3D forming device can reach accurate superposition. Thus, the invention provides a complete method and implementing process, enabling the 3D digital model to output correct data to the 3D forming device.

Compared with prior arts, data processing for the method and system generates full-color sectional drawings and positioning mechanisms, such that 3D full-color images can be generated by combining general inkjet printing films and special films. The method and system can directly print a 3D full-color image using a printer to ensure the color completeness and accuracy of the 3D model. Additionally, the shape and color can be self-defined, so colors for a colorful 3D model can be printed.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D object fabrication method, implemented in a 3D fabrication system comprising a printing device, comprising:
   providing a plurality of pieces of plane material;
   retrieving a digital object model;
   generating a plurality of sections of the digital object model on a plurality of planes perpendicular to a vector;
   printing each of the sections of the digital object model on a respective one of the plurality of pieces of plane material using the printing device; and
   superposing the pieces of plane material on each other to form a physical 3D object of the digital object model, wherein each of the sections is composed of point data, and the printing step further comprises printing a color of a color pigment of the point data on the respective one of the pieces of plane material according to a color of a point data of a section.

2. The 3D object fabrication method as claimed in claim 1, wherein the sections are respectively printed on the pieces of plane material using color pigments.

3. The 3D object fabrication method as claimed in claim 1, wherein the pieces of plane material are transparent.

4. The 3D object fabrication method as claimed in claim 1, further comprising:
   respectively projecting each of the sections onto each of a plurality of layouts; and
   in the printing step, printing the layouts to the pieces of plane material.

5. The 3D object fabrication method as claimed in claim 1, wherein a section projected onto a layout comprises point data, further comprising:
   forming an outline line of the digital object model on the layout using the point data of the layout; and
   in the printing step, printing the outline line to the respective one of pieces of plane material.

6. The 3D object fabrication method as claimed in claim 5, further comprising:
   determining the width of the outline line.

7. The 3D object fabrication method as claimed in claim 5, further comprising:
   forming the outline line of the digital object model based on the point data using interpolation.

8. The 3D object fabrication method as claimed in claim 5, wherein a first point data of the section is projected on the layout to be a second point data, further comprising:
   generating a color of the second point data according to a color of the first point data.

9. The 3D object fabrication method as claimed in claim 1, wherein the printing step further comprises:
   outputting a locating mark to each piece of the plane material and superposing the pieces of plane material according to the locating marks on the pieces of plane material to construct the physical 3D object of the digital object model.

10. The 3D object fabrication method as claimed in claim 1, further comprising determining the vector.

11. The 3D object fabrication method as claimed in claim 1, further comprising determining distances between the planes.

12. A 3D object fabrication system, comprising:
    a plurality of pieces of plane material;
    a computer device, retrieving a digital object model and generating a plurality of sections of the digital object model on a plurality of planes perpendicular to a vector; and
    an output device, the output device comprising a print device configured to print each of the sections of the digital object on a respective one of the plurality of pieces of plane material, the output device configured to superpose the pieces of plane material to form a physical 3D object of the digital object model;
    wherein each of the sections is composed of point data, and the print device is configured to print a color of a color pigment of the point data on the respective one of the pieces of plane material according to a color of a point data of a section.

13. The 3D object fabrication system as claimed in claim 12, wherein the pieces of plane material are transparent.

14. The 3D object fabrication method as claimed in claim 1, wherein the digital object model is with a color pattern map.

15. The 3D object fabrication method as claimed in claim 1, further comprising:
    cutting the pieces of plane material along outlines of the digital object model.

* * * * *